US011320802B2

(12) United States Patent
Garcia Reyero Vinas et al.

(10) Patent No.: US 11,320,802 B2
(45) Date of Patent: *May 3, 2022

(54) METHOD FOR SETTING PRINTING PROPERTIES OF A THREE-DIMENSIONAL OBJECT FOR ADDITIVE MANUFACTURING PROCESS

(71) Applicant: Hewlett-Packard Development Company, L.P., Spring, TX (US)

(72) Inventors: Juan Manuel Garcia Reyero Vinas, Sant Cugat del Valles (ES); Jan Morovic, Colchester (GB); Peter Morovic, Sant Cugat del Valles (ES)

(73) Assignee: Hewlett-Packard Development Company, L.P., Spring, TX (US)

( * ) Notice: Subject to any disclaimer, the term of this patent is extended or adjusted under 35 U.S.C. 154(b) by 110 days.

This patent is subject to a terminal disclaimer.

(21) Appl. No.: 16/943,840

(22) Filed: Jul. 30, 2020

(65) Prior Publication Data
US 2020/0356074 A1 Nov. 12, 2020

Related U.S. Application Data

(63) Continuation of application No. 15/545,280, filed as application No. PCT/EP2015/058932 on Apr. 24, 2015, now Pat. No. 10,845,780.

(51) Int. Cl.
*G05B 19/4099* (2006.01)
*B33Y 50/00* (2015.01)
*B33Y 50/02* (2015.01)

(52) U.S. Cl.
CPC .......... *G05B 19/4099* (2013.01); *B33Y 50/00* (2014.12); *B33Y 50/02* (2014.12);
(Continued)

(58) Field of Classification Search
USPC .......................................................... 700/98
See application file for complete search history.

(56) References Cited

U.S. PATENT DOCUMENTS

| 7,364,686 B2 | 4/2008 | Kritchman et al. |
| 7,456,842 B2 | 11/2008 | Kosolapov |

(Continued)

FOREIGN PATENT DOCUMENTS

| CN | 101814188 | 8/2010 |
| CN | 102211345 | 10/2011 |

(Continued)

OTHER PUBLICATIONS

Wentworth et al., "How to Think like a Computer Scientist: Learning with Python 3" 2014; Openbook Project; hosted online at openbookproject.net; retrieved from archive.org on Apr. 21, 2020 (Year: 2014).*

Benjamin Bustos, Daniel A. Keim, Dietmar Saupe, Tobias Schreck, and Dejan V. Vrani'C, Feature-Based Similarity Search in 3D Object Databases, University of Konstanz, Dec. 2005.

(Continued)

*Primary Examiner* — Mohammad Ali
*Assistant Examiner* — Joshua T Sanders
(74) *Attorney, Agent, or Firm* — HP Inc. Patent Department

(57) ABSTRACT

A method is described in which data representing a three-dimensional object to be printed is obtained. The data comprises sub-volumes representing the three-dimensional object. A characteristic for the three-dimensional object to be printed is identified. Based on the identified characteristic, property data is set for individual sub-volumes to be used in printing the three-dimensional object. The identified characteristic is a function of the property data. The property data comprises material property data, structural property data and printing property data.

12 Claims, 2 Drawing Sheets

(52) U.S. Cl.
CPC ............. *G05B 2219/35134* (2013.01); *G05B 2219/49023* (2013.01)

(56) References Cited

U.S. PATENT DOCUMENTS

| | | |
|---|---|---|
| 7,766,641 B2 | 8/2010 | Silverbrook |
| 7,910,193 B2 | 3/2011 | Ma |
| 8,142,860 B2 | 3/2012 | Vanmaele et al. |
| 2010/0195122 A1 | 8/2010 | Kritchman |
| 2013/0053995 A1 | 2/2013 | Hashimoto |
| 2014/0107823 A1 | 4/2014 | Huang |
| 2014/0324204 A1 | 10/2014 | Vidimce et al. |
| 2015/0045924 A1 | 2/2015 | Cluckers et al. |

FOREIGN PATENT DOCUMENTS

| | | | |
|---|---|---|---|
| WO | WO-2013113372 | 8/2013 | |
| WO | WO-2013113372 A1 * | 8/2013 | ........... B29C 64/393 |
| WO | WO-2014-015994 A1 | 1/2014 | |
| WO | WO-2014015994 A1 * | 1/2014 | ........... B29C 64/223 |

OTHER PUBLICATIONS

E.L. Doubrovski a, E.Y. Tsai b, D. Dikovsky c, J.M.P. Geraedis a, H. Herr b, N. Oxmanb, Voxel-based fabrication through material properly mapping: A design method ter bitmap printing Dec. 2, 2014.

Hiller, J et al., "Tunable digital material properties for 3D voxel printers." Rapid Prototyping Journal 16, No. 4 (2010): 241-247.

International Search Report and Written Opinion dated Apr. 4, 2016, PCT Patent Application No. PCT/EP2015/058932, filed Apr. 24, 2015, European Patent Office.

Jonathan Hiller et al., "Tunable digital material properties for 3D voxel printers", Internet Citation, Sep. 10, 2008 (Sep. 10, 2008), pp. 33-44.

Kiril Vidimce Szu-Po Wang Jonathan Ragan-Kelley Wojciech Matusik Massachusetts Institute of Technology OpenFab: A Programmable Pipeline for Multi-Material Fabrication Apr. 27, 2013.

Stanic et al: "Color and permanence issues in 3D ink-jet printing", MIPRO 2010, May 24-28, 2010, Opatija, Croatia, Proceedings of the 33rd International Convention, IEEE, PISC.

* cited by examiner

METHOD FOR SETTING PRINTING PROPERTIES OF A THREE-DIMENSIONAL OBJECT FOR ADDITIVE MANUFACTURING PROCESS

PRIORITY

This application is a Continuation of commonly assigned and U.S. patent application Ser. No. 15/545,280, filed Jul. 20, 2017, which claims priority to International Patent Application No. PCT/EP2015/058932, filed Apr. 4, 2015, titled "METHOD FOR SETTING PRINTING PROPERTIES OF A THREE-DIMENSIONAL OBJECT FOR ADDITIVE MANUFACTURING PROCESS". The disclosures of the U.S. Patent Application and the International Patent Application are hereby incorporated by reference in their entireties.

BACKGROUND

Three-dimensional objects generated by an additive manufacturing process may be formed in a layer-by-layer manner. In one example of additive manufacturing, an object is generated by solidifying portions of layers of build material in an apparatus. In examples, the build material may be in the form of a powder, fluid or sheet material. The intended solidification and/or physical properties may be achieved by printing an agent onto a layer of the build material. Energy may be applied to the layer and the build material on which an agent has been applied may coalesce and solidify upon cooling. In other examples, chemical binding agents may be used, which may not need the application of energy to solidify. For example, three-dimensional objects may be generated by using extruded plastics or sprayed materials as build materials, which solidify to form an object.

BRIEF DESCRIPTION OF DRAWINGS

For a more complete understanding, various examples will now be described below with reference to the accompanying drawings in which.

DETAILED DESCRIPTION

Figure 1:
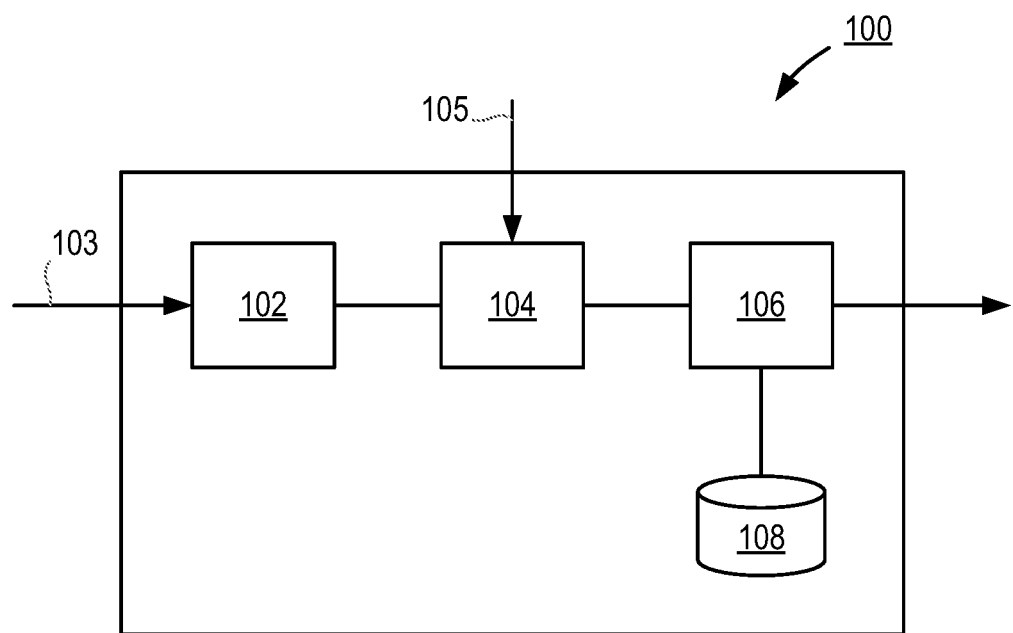
FIG. 1 is a block diagram of an example apparatus which makes use of the present disclosure.

Some examples described herein provide an apparatus and a method for setting properties of a three-dimensional object that may be used to produce the three-dimensional object. Some examples allow arbitrary three-dimensional content with a variety of specified object properties to be processed and used to generate a three-dimensional object. These object properties may comprise appearance properties and/or mechanical properties such as colour, transparency, glossiness, strength, conductivity, density, porosity, etc.

In some examples herein, three-dimensional space is characterised in terms of sub-volumes. The sub-volumes may be in the form of "voxels", i.e. three-dimensional pixels, wherein each voxel occupies a discrete volume. However, it will be understood that the sub-volume may be any volumetric entity that may take any shape (for example, cubic, cuboid, tetrahedron, or any other shape). In data modelling a three-dimensional object, a sub-volume at a given location may have at least one property. For example, it may be empty, it may have a particular colour, it may represent a particular material, it may represent a particular structural property, and/or the like.

In some examples, data representing a three-dimensional object is processed to set properties to be used in generating the object.

In some examples, a material volume coverage representation defines print material data, for example detailing the amount of print materials (such as agent(s) to be deposited onto a layer of build material, or in some examples, build materials themselves), and, if applicable, their combinations. In some examples, this may be specified as a proportional volume coverage (for example, X % of a region of a layer of build material should have agent Y applied thereto). Such print materials may be related to or selected to provided an object property such as, for example, colour, transparency, flexibility, elasticity, rigidity, surface roughness, porosity, conductivity, inter-layer strength, density, and the like.

The actual location at which each print material (for example, a drop of an agent) should be applied may be determined using halftoning techniques.

For example, a set of sub-volumes within object model data may have an associated set of material volume coverage (Mvoc) vectors. In a simple case, such a vector may indicate that X % of a given region of three-dimensional space should have a particular agent applied thereto, whereas (100-X) % should have no agent applied thereto. The material volume coverage representation may then provide the input for a halftoning process to generate control data that may be used by an additive manufacturing system to produce a three-dimensional object. For example, it may be determined that, to produce specified object properties, 25% of a layer of build material (or of a portion of a layer) should have an agent applied thereto. The halftoning process determines where the drops of agent should be deposited in order to provide 25% coverage, for example, by comparing each location to a threshold value provided in a halftone threshold matrix. In another case, there may be two agents and the volume coverages of each of them, of their combination and of the volume left clear may be directly determined.

It may be the case that, at the time the 3D data model is constructed, a print apparatus to be used to print the object is unspecified, at least in terms of its capabilities.

The present subject-matter is further described with reference to FIGS. 1 and 2. It should be noted that the description and figures merely illustrate principles of the present subject-matter. It is thus understood that various arrangements may be devised that, although not explicitly described or shown herein, embody the principles of the present subject-matter. Moreover, all statements herein reciting principles and examples of the present-subject matter, as well as specific examples thereof, are intended to encompass equivalents thereof.

FIG. 1 is an apparatus 100 according to an example of the present subject-matter. The apparatus 100 comprises an obtaining module 102 to obtain data 103 representing a three-dimensional object, an identifying module 104 to identify data, a processor 106 to process data and a machine-readable storage 108 to store data. The machine-readable storage 108 may store data for access by an application program being executed by the processor 106 and may comprise a data structure including information for use by the application program. The machine-readable storage 108 may be any electronic, magnetic, optical or other physical storage device that stores executable instructions. Thus, machine-readable storage 108 may be, for example, a Random Access Memory (RAM), an Electrically-Erasable Programmable Read-Only Memory (EEPROM), a storage drive, an optical disc or the like. The machine-readable storage 108 may be encoded with executable instructions.

Figure 2:
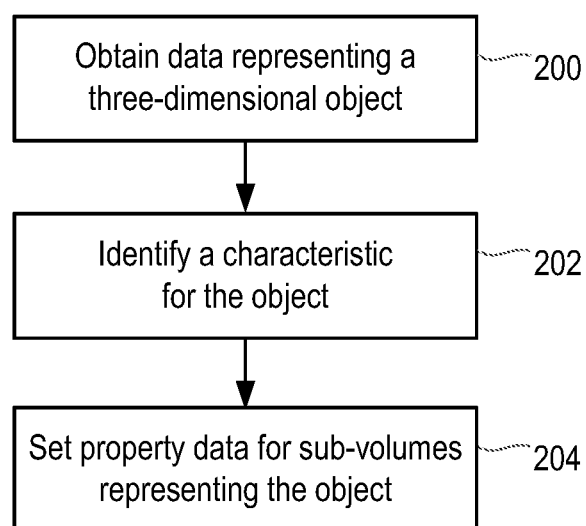
FIG. 2 is a flowchart of an example of a process which may be employed according to the present disclosure.

FIG. 2 is a flowchart of an example of a process which may be employed according to the present disclosure and will now be described also with reference to FIG. 1.

At block 200, the obtaining module 102 obtains data representing a three-dimensional object to be printed. The data may comprise geometric information of the three-dimensional model to be printed in the form of sub-volumes that represent or make up the three-dimensional object. The sub-volumes may be in the form of an array with each sub-volume being located at a unique three-dimensional location within the three-dimensional object.

At block 202, the identifying module 104 identifies or obtains a characteristic for the three-dimensional object to be printed. In one example, the identified characteristic for the three-dimensional object to be printed may be identified from a user input received at a user interface (not shown). The user input may indicate or specify the characteristic. The identified characteristic may include information about the properties that the three-dimensional object is to have once it has been produced or printed. For example, the identified characteristic for the three-dimensional object may include information or values in respect of elasticity, weight, opacity, ductility, flexibility, colour, conductivity, rigidity, surface roughness, porosity, strength, and/or any other characteristic. In one example, the identifying module 104 may identify a particular value for the weight and a particular value for the elasticity of the three-dimensional object. The identifying module 104 may identify different characteristics for different portions or partial volumes of the three-dimensional object. For example, the identifying module 104 may identify one characteristic or set of characteristics for the interior of the three dimensional object and another characteristic or set of characteristics for the exterior or surface of the three-dimensional object, etc.

At block 204, based on the identified characteristic, the processor 106 sets property data for individual sub-volumes representing the three-dimensional object to be printed. The property data includes material property data, structural property data and printing property data. It will be understood that the property data may also include other types of data.

The material property data may, for example, include information on the use of materials (such as build materials and/or agents to be deposited onto build materials). For example, the material property data may include data indicating material quantity, material weight, material density, material distribution, material combination (for example, the combination of build materials and agents, the combination of build materials themselves, etc), material volume coverage (Mvoc) information or vectors (as described earlier), colour information and/or any other material property data. The structural property data may, for example, include information on the distribution of materials. For example, the structural property data may include data indicating structural size, structural shape, halftoning information (such as a choice of algorithm, resources, etc) and/or any other structural property data. The printing property data may, for example, include information on the settings to use for the printing system. For example, the printing property data may include data indicating a printing process, a printing technique, a printing speed, a fusing temperature, an instruction to set different material property data and/or structural property data (for example, depending on the availability of materials and/or structures supported) and/or any other printing property data.

The characteristic identified by the identifying module 104 is a function of property data according to the present disclosure. For example, the processor 106 can map the characteristics identified by the identifying module 104 to property data. An example is that the characteristics may be in the form of characteristic vectors $\overline{P}$. A characteristic vector $\overline{P}$ can have as many dimensions as there are independent characteristics. For example, the identifying module 104 may identify a conductivity C and an elasticity E. In this example, a sub-volume v can be associated with a two-dimensional characteristic vector $P_v=(C_v,E_v)$.

In some examples, the processor 106 may associate a target set of characteristics to each sub-volume that is to be printed (i.e. to each printing sub-volume). The process that the processor 106 employs to set characteristics in this way may depend on a variety of factors. For example, it may depend on how characteristics are specified by a user at a user interface. In an example, the processor 106 may first compute target sub-volumes from input sub-volumes, assign those target sub-volumes their target set of properties, and then further subdivide the target sub-volumes into printing sub-volumes.

The processor 106 may set property data (including material property data, structure property data and printing property data) for each printing sub-volume. In other examples, the processor 106 may set property data for a predetermined number of printing sub-volumes (for example, a predetermined set of printing sub-volumes). In this example, the processor 106 may assign other sub-volumes (for example, those outside the predetermined set) with random property data, default property data, or may leave them empty, etc.

Although some property data is controllable (and thus can be set) by the processor 106 at the sub-volume level, there may be some property data that the processor 106 needs to establish for a layer of sub-volumes (for example, the printing speed) and some property data that the processor 106 needs to control globally (for example, the choice of powder onto which agents are deposited or the temperature at which the printing bed is maintained).

In some examples, the processor 106 may set property data for individual sub-volumes to be different for adjacent sub-volumes. For example, the sub-volumes representing the three-dimensional object may comprise surface sub-volumes that represent or define a surface of the three-dimensional object and interior sub-volumes that represent or define an interior volume of three-dimensional object. In this example, the processor 106 may set property data for surface sub-volumes and property data for interior sub-volumes differently or to be different. For example, where the identifying module 104 identifies different characteristics for interior and exterior portions of the three-dimensional object (as discussed earlier).

In some examples, the processor 106 may set property data for individual sub-volumes in a partial volume. For example, as discussed earlier, the identifying module 104 may identify a characteristic for a portion or partial volume of the three-dimensional object (for example, a partial volume may have been indicated at a user interface) and the processor 106 may set property data for individual sub-volumes in that partial volume. In some examples, the processor 106 may set property data for individual sub-volumes in one partial volume differently or to be different from individual sub-volumes in another partial volume (depending on the identified characteristics for those partial volumes).

The processor 106 may encode the property data as a tuple, which can be expressed as $(\overline{S},\overline{M},\overline{\Pi})$ and which describes the structural property data $(\overline{S})$, the material property data $(\overline{M})$ and the printing property data $\overline{\Pi}$).

The machine-readable storage 108 may store material property data, structural property data and printing property data for individual sub-volumes as a function of three-dimensional object characteristics. The machine-readable storage 108 may be preconfigured with this information. Alternatively, or in addition, the machine-readable storage 108 may passively learn this information based on the information that is obtained through use of the apparatus over time. The processor 106 may retrieve from the machine-readable storage 108 the property data for the sub-volumes that most closely or exactly provide the target set of characteristics associated with those sub-volumes. The processor 108 will then set those sub-volumes with the property data retrieved for them. In this way, a three-dimensional object that may subsequently be produced or printed with sub-volumes having that property data will have the identified characteristic.

As an example of the storage of data, the machine-readable storage 108 may store the material property data, structural property data and printing property data as a function of three-dimensional object characteristics in the form of a look-up table (LUT). The LUT may map three-dimensional object characteristics to property data. For example, the LUT may map three-dimensional object characteristics to various combinations of material property data, structural property data and printing property data. In the vector form mentioned earlier, the LUT may map characteristic vector $\overline{P}$ to the tuple $(\overline{S},\overline{M},\overline{\Pi})$ that describes the structural property data $(\overline{S})$, the material property data $(\overline{M})$ and the printing property data $(\overline{\Pi})$. In mathematical form, this can be expressed as $\overline{P} \rightarrow (\overline{S},\overline{M},\overline{\Pi})$. In this way, the processor 106 is able to find the mapping for characteristic vectors $\overline{P}$ that are present in the machine-readable storage 108.

The processor 106 may also have a mechanism for finding the mapping for characteristic vectors $\overline{P}$ that are not present in the machine-readable storage 108. For example, the processor 106 may perform a tetrahedral interpolation for the volumetric distribution of materials to determine the mapping for characteristic vectors $\overline{P}$ that are not present in the machine-readable storage 108.

In this example, an n-dimensional LUT is assumed, containing $k^n$ entries, where k is the number of steps per dimension. This LUT, indexed in terms of the members of $\overline{P}$, contains $\overline{S}$, $\overline{M}$ and $\overline{\Pi}$ directly for the LUT nodes. For example, a three-dimensional LUT where $\overline{P}$ is colour (expressed, for example, in terms of RGB values) may have $9^3 = 729$ nodes. When the input matches a node's $\overline{P}$ vector, the output is directly contained in the corresponding node. Otherwise, the simplex enclosing the input $\overline{P}$ vector is found (i.e. n+1 vertices with respect to which barycentric coordinates add up to 1), and barycentric coordinates within it are used as weights for convexly combining the corresponding output values of those n+1 nodes. Although a tetrahedeal three-dimensional interpolation is provided as an example here, it will be understood that any other interpolation technique can be used.

The method described above can be used to control or set the sub-volume level properties of a three-dimensional object. In an example, the method described above can be used to control the sub-volume level weight of a three-dimensional object. In this example, by having one of the elements of the characteristic vector $\overline{P}$ be the desired weight, it is possible to assign each weight to a different halftoning structure, each with a different built-in density. In this example, it is assumed that there are two sets of characteristics $\overline{P}_1$ and $\overline{P}_2$, which are associated with two sub-volumes respectively and which share all values except the value corresponding to the weight. For example, if the characteristics specify weight W and elasticity E, then $W_1 \neq W_2$ and $E_1 = E_2 = E_3$. Then, by virtue of the different weights, the structures of the two sub-volumes will be different (i.e. $S_1 \neq S_2$) but the volumetric distribution of materials MVocs chosen will also be different (i.e. $M_1 \neq M_2$) as a different distribution of materials will be used to achieve an elasticity E with each structure. The printing parameters may also differ, as they may affect elasticity differently with different structures. Once the processor 106 has set the sub-volume level properties in any of the above described ways, the processor 106 has the data that will produce a three-dimensional object having the identified characteristics. The processor 106 may instruct the apparatus 100 to produce or print the three-dimensional object using the property data set for individual sub-volumes. The processor 106 may instruct the apparatus 100 to produce or print automatically after setting property data or may receive a user input indicating that production or printing should begin. The processor 106 may receive the user input instructing production or printing to begin at any stage in the process according to the present disclosure. For example, the processor 106 may receive the user input instructing production or printing to begin once the processor 106 has set the property data for individual sub-volumes representing the three-dimensional object to be printed or at any other stage during the process according to the present disclosure. The processor 106 may provide the data to another apparatus, device or system (not shown) for object production or printing.

Examples in the present disclosure can be provided as methods, systems or machine-readable instructions, such as any combination of software, hardware, firmware or the like. Such machine-readable instructions may be included on a machine-readable storage medium (including but is not limited to disc storage, CD-ROM, optical storage, etc.) having machine-readable program code therein or thereon.

The present disclosure is described with reference to flow charts and/or block diagrams of the method, apparatus and systems according to examples of the present disclosure. Although the flow diagrams described above show a specific order of execution, the order of execution may differ from that which is depicted. Blocks described in relation to one flow chart may be combined with those of another flow chart. It shall be understood that each flow and/or block in the flow charts and/or block diagrams, as well as combinations of the flows and/or diagrams in the flow charts and/or block diagrams can be realised by machine-readable instructions.

The machine-readable instructions may, for example, be executed by a general purpose computer, a special purpose computer, an embedded processor or processors of other programmable data processing devices to realise the functions described in the description and figures. For example, a processing apparatus or processor, such as the processor 106, may execute the machine-readable instructions. Thus, functional modules of the apparatus and devices may be implemented by a processor executing machine-readable instructions stored in a memory, or a processor operating in accordance with instructions embedded in logic circuitry.

The term "processor" is to be interpreted broadly to include a processing unit, central processing unit (CPU), application-specific integrated circuit (ASIC), logic unit, programmable gate array, etc. The methods and functional modules may all be performed by a single processor or divided amongst several processors.

Such machine-readable instructions may also be stored in a machine-readable storage, such as machine-readable storage 108, that can guide the computer or other programmable data processing devices to operate in a specific mode.

Such machine-readable instructions may also be loaded onto a computer or other programmable data processing devices, so that the computer or other programmable data processing devices perform a series of operations to produce computer-implemented processing, thus the instructions executed on the computer or other programmable devices provide a means for realising functions specified by flow(s) in the flow charts and/or block(s) in the block diagrams.

Further, the teachings herein may be implemented in the form of a computer software product, the computer software product being stored in a storage medium and comprising a plurality of instructions for making a computer device implement the methods recited in the examples of the present disclosure.

While the method, apparatus and related aspects have been described with reference to certain examples, various modifications, changes, omissions, and substitutions can be made without departing from the spirit and scope of the present disclosure. It should be noted that the above-mentioned examples illustrate rather than limit what is described herein, and that those skilled in the art will be able to design many alternative implementations without departing from the scope of the appended claims. For example, a feature or block from one example may be combined with or substituted by a feature/block of another example.

The word "comprising" does not exclude the presence of elements other than those listed in a claim, "a" or "an" does not exclude a plurality, and a single processor or other unit may fulfil the functions of several units recited in the claims.

The features of any dependent claim may be combined with the features of any of the independent claims or other dependent claims.

The invention claimed is:

1. A method comprising:
   obtaining data representing sub-volumes of a three-dimensional (3D) object to be printed;
   identifying characteristics for the sub-volumes of the 3D object to be printed;
   creating, by a processor, sets of property data for the sub-volumes of the 3D object based on the characteristics for the sub-volumes of the 3D object, wherein each set of the sets of property data comprises a combination of material property data, structural property data, and printing property data for each sub-volume of the sub-volumes of the 3D object; and
   creating, by the processor, a look-up table that maps the characteristics for the sub-volumes of the 3D object to the sets of property data for the sub-volumes of the 3D object, wherein the sets of property data in the look-up table are to be used to print the 3D object,
   wherein the sub-volumes comprise surface sub-volumes representing a surface of the 3D object and interior sub-volumes representing an interior of the 3D object, and
   wherein creating the sets of property data for the sub-volumes includes setting sets of property data for the surface sub-volumes to be different from sets of property data for the interior sub-volumes.

2. The method of claim 1, wherein creating the sets of property data for the sub-volumes of the 3D object comprises setting the sets of property data to be different for adjacent sub-volumes.

3. The method of claim 1, further comprising:
   encoding each set of the sets of property data as a tuple in a form of (S, M, Π) which describes the structural property data S, the material property data M, and the printing property data Π for each of the sub-volumes.

4. The method of claim 1, wherein the characteristics for the sub-volumes of the 3D object includes values of elasticity, weight, opacity, ductility, flexibility or conductivity for the sub-volumes.

5. An apparatus comprising:
   a processor; and
   a memory storing instructions that are executable to cause the processor to:
      obtain data representing sub-volumes of a three-dimensional (3D) object to be printed;
      identify characteristics for the sub-volumes of the 3D object to be printed;
      create sets of property data for the sub-volumes of the 3D object based on the characteristics for the sub-volumes of the 3D object, wherein each set of the sets of property data comprises a combination of material property data, structural property data, and printing property data for each sub-volume of the sub-volumes of the 3D object; and
      create a look-up table that maps the characteristics for the sub-volumes of the 3D object to the sets of property data for the sub-volumes of the 3D object, wherein the sets of property data in the look-up table are to be used to print the 3D object,
   wherein the sub-volumes comprise surface sub-volumes representing a surface of the 3D object and interior sub-volumes representing an interior of the 3D object, and
   wherein the instructions that cause the processor to create the sets of property data for the sub-volumes include instructions that cause the processor to set sets of property data for the surface sub-volumes to be different from sets of property data for the interior sub-volumes.

6. The apparatus of claim 5, wherein the instructions that cause the processor to create the sets of property data for the sub-volumes of the 3D object include instructions that cause the processor to set the sets of property data to be different for adjacent sub-volumes.

7. The apparatus of claim 5, wherein the instructions are executable to cause the processor to:
   encode each set of the sets of property data as a tuple in a form of (S, M, Π) which describes the structural property data S, the material property data M, and the printing property data Π for each of the sub-volumes.

8. The apparatus of claim 5, wherein the material property data for each of the sub-volumes includes data indicating a material quantity, a material weight, a material density, or a material distribution.

9. A non-transitory machine-readable storage medium storing instructions that are executable by a processor to cause the processor to:
   obtain data representing sub-volumes of a three-dimensional object (3D) to be printed;
   identify characteristics for the sub-volumes of the 3D object to be printed;

create sets of property data for the sub-volumes of the 3D object based on the characteristics for the sub-volumes of the 3D object, wherein each set of the sets of property data comprises a combination of material property data, structural property data and printing property data for each sub-volume of the sub-volumes of the 3D object; and create a look-up table that maps the characteristics for the sub-volumes of the 3D object to the sets of property data for the sub-volumes of the 3D object, wherein the sets of property data in the look-up table are to be used to print the 3D object, wherein the sub-volumes comprise surface sub-volumes representing a surface of the 3D object and interior sub-volumes representing an interior of the 3D object, and wherein the instructions that cause the processor to create the sets of property data for the sub-volumes include instructions that cause the processor to set sets of property data for the surface sub-volumes to be different from sets of property data for the interior sub-volumes.

10. The non-transitory machine-readable storage medium of claim 9, wherein the instructions that cause the processor to create the sets of property data for the sub-volumes of the 3D object include instructions that cause the processor to set the sets of property data to be different for adjacent sub-volumes.

11. The non-transitory machine-readable storage medium of claim 9, wherein the instructions are executable to cause the processor to:
encode each set of the sets of property data as a tuple in a form of (S, M, Π) which describes the structural property data S, the material property data M, and the printing property data Π for each of the sub-volumes.

12. The non-transitory machine-readable storage medium of claim 9, wherein the characteristics for the sub-volumes of the 3D object includes values of elasticity, weight, opacity, ductility, flexibility or conductivity for the sub-volumes.

* * * * *